United States Patent
Kobayashi et al.

(10) Patent No.: US 7,518,660 B2
(45) Date of Patent: Apr. 14, 2009

(54) PICTURE QUALITY IMPROVEMENT DEVICE AND PICTURE QUALITY IMPROVEMENT METHOD

(75) Inventors: Michio Kobayashi, Tokyo (JP); Eifu Nezu, Tokyo (JP)

(73) Assignee: NEC Viewtechnology, Ltd., Tokyo (JP)

( * ) Notice: Subject to any disclaimer, the term of this patent is extended or adjusted under 35 U.S.C. 154(b) by 689 days.

(21) Appl. No.: 11/272,783

(22) Filed: Nov. 15, 2005

(65) Prior Publication Data

US 2006/0103763 A1 May 18, 2006

(30) Foreign Application Priority Data

Nov. 16, 2004 (JP) .............................. 2004-331638

(51) Int. Cl.
*H04N 5/21* (2006.01)

(52) U.S. Cl. .................. 348/625; 348/630; 348/688

(58) Field of Classification Search ................. 348/606, 348/712, 713, 688, 625, 630, 631, 687; 382/260, 382/264, 266, 269; *H04N 5/21, 5/57, 9/77, H04N 9/64*
See application file for complete search history.

(56) References Cited

U.S. PATENT DOCUMENTS

| | | | | |
|---|---|---|---|---|
| 5,717,789 | A | * | 2/1998 | Anderson et al. ............ 382/260 |
| 6,965,416 | B2 | * | 11/2005 | Tsuchiya et al. ............ 348/625 |

FOREIGN PATENT DOCUMENTS

| | | |
|---|---|---|
| JP | 62-135081 | 6/1987 |
| JP | 1-246984 | 10/1989 |
| JP | 1-246985 | 10/1989 |
| JP | 4-172875 | 6/1992 |
| JP | 5-268575 | 10/1993 |
| JP | 6-276415 | 9/1994 |
| JP | 2525450 | 5/1996 |
| JP | 2000-184384 | 6/2000 |
| JP | 2002-290772 | 10/2002 |
| JP | 2003-46810 | 2/2003 |

OTHER PUBLICATIONS

Japanese Office Action dated Jan. 23, 2008, with partial English translation.

* cited by examiner

*Primary Examiner*—Sherrie Hsia
(74) *Attorney, Agent, or Firm*—McGinn IP Law Group, PLLC

(57) ABSTRACT

A field delay circuit aligns the phases of two field signals. An average value calculation circuit generates an average value signal of the two field signals. This average value signal can be regarded as a signal that has undergone a one-dimensional low-pass filter process in the row direction in which the number of taps for a progressive signal is 2 and the filter coefficient for each tap is 0.5 and that has then been thinned to one-half the data. A two-dimensional LPF circuit subjects this average value signal to a low-pass filter process and eliminates the high-frequency components (edge components). A subtraction circuit subtracts the average value signal that has undergone the LPF process from each field signal and thus extracts the edge components of each field signal. An amplification circuit multiplies the edge components of each field signal by a prescribed factor. An addition circuit adds the resulting amplified edge components to each field signal.

6 Claims, 7 Drawing Sheets

PICTURE QUALITY IMPROVEMENT DEVICE AND PICTURE QUALITY IMPROVEMENT METHOD

BACKGROUND OF THE INVENTION

1. Field of the Invention

The present invention relates to a picture quality improvement device of video signals and a picture quality improvement method of video signals.

2. Description of the Related Art

In an image display device such as a television image receiver or video projector, picture quality is known to deteriorate due to the occurrence of flare. Flare is a phenomenon in which the reflection or scattering of light on the irradiation surface or lens of a picture tube or projector tube causes the intrusion of light of a bright area into a dark area, thereby producing blurring of edges at which the differences in the luminance in a displayed image are great (for example, at the borders of white regions and black regions).

To correct this type of flare, image processing is carried out to emphasize edges having large differences in luminance in a displayed image. Referring to FIG. 1, a block diagram is shown that shows an example of the configuration of a picture quality improvement device of the prior art for correcting flare by image processing for emphasizing edges (Refer to JP-A-H01-246984 (Patent Document 1) or JP-A-H01-246985 (Patent Document 2)). In FIG. 1, image processing is carried out to emphasize edges for the Y signal of a luminance (Y)/color difference (C) signal.

In FIG. 1, Y input signal (Yin) is applied as input to delay compensation circuit 31 and two-dimensional low-pass filter (LPF) circuit 32. Delay compensation circuit 31 is a circuit for delaying the input signal the time required for the processing of two-dimensional LPF circuit 32. Two-dimensional LPF circuit 32 is a filter for eliminating from the input signal frequency components (such as edge components) that have higher frequency than a prescribed frequency. Two-dimensional LPF circuit 32 is made up from, for example, a delay circuit, an amplification circuit, and an addition circuit; and eliminates the high-frequency component of the input signal by replacing the data of a particular picture element with, for example, the weighted average of data of a plurality of adjacent picture elements (refer to Patent Document 2).

Due to the elimination of the high-frequency component of the Y input signal that is applied as input to two-dimensional LPF circuit 32, a signal having dulled edges is supplied as output from two-dimensional LPF circuit 32 (refer to the waveform shown in FIG. 1). The Y input signal that has been delayed by delay compensation circuit 31 a time interval that corresponds to the processing time of two-dimensional LPF circuit 32 and the signal having dulled edges that is supplied as output from two-dimensional LPF circuit 32 are applied as input to subtraction circuit 34. Subtraction circuit 34 supplies as output a signal in which the latter signal has been subtracted from the former signal. Accordingly, subtraction circuit 34 supplies as output a signal in which the high-frequency component (edge component) that was eliminated by two-dimensional LPF circuit 32 has been extracted (Refer to the waveform shown in FIG. 1). Amplification circuit 35 multiplies the signal in which the high-frequency component has been extracted and that has been supplied as output from subtraction circuit 34 by a prescribed factor and supplies this signal to addition circuit 36 (Refer to the waveform that is shown in FIG. 1). Addition circuit 36 adds the signal that was supplied as output from amplification circuit 35, in which the high-frequency component was extracted and that was then multiplied by a prescribed factor, to the Y input signal that is supplied from delay compensation circuit 31. The resulting Y output signal (Yout) is a signal in which the edge components of the Y input signal have been emphasized (Refer to the waveform that is shown in FIG. 1). The above-described process thus realizes flare correction. In addition, the C input signal (Cin) is subjected to a delay process by delay compensation circuit 33 for the time interval of the processing of two-dimensional LPF circuit 32, subtraction circuit 34, amplification circuit 35, and addition circuit 36, and is then supplied as a C output signal (Cout).

In the foregoing explanation, flare correction was carried out only for the Y signal because, of the luminance/color difference signal, flare correction in the Y signal has the greatest effect on picture quality improvement. Obviously, flare correction may also be carried out not only for the Y signal but for the C signal as well. Flare correction may also be carried out for the RGB (Red, Green, and Blue) signals (in which case, flare correction for the G signal has the greatest effect on picture quality improvement).

According to, for example, the standards of the NTSC (National Television System Committee), the luminance/color difference signal is often transmitted as an interlaced signal (RGB signals are not often transmitted as interlaced signals). Referring to FIG. 2, a schematic view is shown for explaining an interlaced signal in comparison with a progressive signal (a), which is the counter-concept of an interlaced signal (b). In an interlaced signal, in contrast to a progressive signal, a video signal that corresponds to odd-numbered rows in the horizontal direction (y direction) in FIG. 2 is first transmitted, following which a video signal that corresponds to even-numbered rows is transmitted. The video signal (F1) that corresponds to odd-numbered rows and the video signal (F2) that corresponds to even-numbered rows are referred to as "field signals," and the two field signals make up one frame. In the following explanation, the data string that makes up F1 is s1, s3, s3, . . . , and the data string that makes up F2 is t1, t2, t3, . . . .

Using the picture quality improvement device of FIG. 1 to correct flare in a luminance/color difference signal that is transmitted as this type of interlaced signal gives rise to the problem described hereinbelow. Referring to FIG. 3A and 3B, schematic views are shown for explaining this problem. In addition, FIG. 3B is a schematic view for explaining this problem based on sections that are taken along line "a" in each view of FIG. 3A.

When flare correction is carried out for a luminance/color difference signal that is transmitted as an interlaced signal, flare is normally corrected separately for video signal (F1) that corresponds to odd-numbered rows and video signal (F2) that corresponds to even-numbered rows in the picture quality improvement device of FIG. 1, following which these video signals are combined.

When this method is used, however, flare correction cannot be realized accurately when the video image changes with each row. For example, if luminance exists only in odd-numbered rows (F1) as shown by input signal (a) in FIG. 3A and FIG. 3B, resolving the input signal of FIG. 3A and FIG. 3B to the F1 signal and F2 signal results in the F1 signal (b) that is identical to the input signal and F2 signal (c) that simply represents the background signal. Separate implementation of flare correction for these field signals will then result in emphasized edges for the F1 signal (d), but for the F2 signal, which is merely the background signal, edges will not be emphasized (e). Subsequent combination of these images results in the generation of an unnatural picture (f) in which no edge emphasis occurs in even-numbered rows. For the purpose of reference, a picture that has undergone appropriate flare correction is also shown (g).

To avoid this problem, a solution can be considered in which interlaced/progressive conversion circuit 61 is provided before picture quality improvement device 62, as shown in FIG. 4, whereby flare correction is carried out by the picture quality improvement device of FIG. 1 (picture quality improvement device 62) after first converting the interlaced signal to a progressive signal. Adoption of this approach solves the above-described problem because flare correction is not carried out separately for the F1 signal and F2 signal. However, the sampling clock frequency of the progressive signal following conversion is twice the sampling clock frequency of the interlaced signal before conversion, and this increase in frequency raises the problem that two-dimensional LPF circuit 32 is required to perform high-speed processing, and this high-speed processing imposes an excessive load on the circuit.

SUMMARY OF THE INVENTION

It is an object of the present invention to provide a picture quality improvement device that both allows flare correction at the sampling clock frequency of an interlaced signal without changing frequency and without placing an excessive load on elements such as two-dimensional LPF circuits, and allows accurate flare correction even when the video image is an input signal that changes with each row.

To achieve the above-described object, the picture quality improvement device of the present invention is provided with a field delay circuit for effecting delay equal to the time of one field and an average value generation circuit, and generates an average value signal (having the data string (s1+t1)/2, (s2+t2)/2, (s3+t3)/2, . . . ) of the F1 signal (having the data string s1, s2, s3, . . . ) and the F2 signal (having the data string t1, t2, t3, . . . ). A two-dimensional low-pass filter process is next carried out for this average value signal, whereby frequency components (edge component) having frequencies higher than a prescribed frequency are eliminated. The data string of the average value signal that has undergone the two-dimensional low-pass filter process is next subtracted from the data string of each field signal that has been received as input to generate signals in which the high-frequency component of each field signal has been extracted. The data strings of the signals in which the high frequency components have been extracted are next multiplied by a prescribed factor for each field signal, and the results are then added to the data strings of each field signal that have been received as input. The two field signals are then combined and displayed.

The generation of the average value signal of the F1 signal and the F2 signal corresponds to subjecting a progressive signal to a type of one-dimensional low-pass filter process for the row direction and then thinning the number of data items by one half for the row direction. As a result, the high-frequency components (edge components) that are extracted by subjecting the data string of the average value signal to a two-dimensional low-pass filter process and then subtracting the result from the data strings of each field have far greater accuracy than high-frequency components that are extracted from each field signal separately. This greater accuracy is obtained because the high frequency components are extracted after first reflecting the data of each field signal.

In addition, the generation of the average value signal in the present invention results in the performance of a type of one-dimensional low-pass filter process before carrying out the two-dimensional low-pass filter process, but this does not present a serious problem because the cutoff frequency that is realized by the generation of the average value signal is believed to generally surpass the cutoff frequency that is realized by the two-dimensional low-pass filter process.

As described in the foregoing explanation, the picture quality improvement device according to the present invention performs image processing to emphasize edges for the purpose of correcting flare without altering the interlaced signal, and each element of the picture quality improvement device need only be able to operate at a sampling clock frequency that is identical to that of the interlaced signal. Accordingly, an excessive load is not placed upon elements such as two-dimensional LPF circuits. In addition, edge components are extracted after first reflecting both the F1 signal and F2 signal, whereby the accuracy of flare correction is enhanced even in the case of an input signal of an image that changes with each row.

The above and other objects, features, and advantages of the present invention will become apparent from the following description with reference to the accompanying drawings, which illustrate examples of the present invention.

DETAILED DESCRIPTION OF THE PREFERRED EMBODIMENTS

Figure 3A:
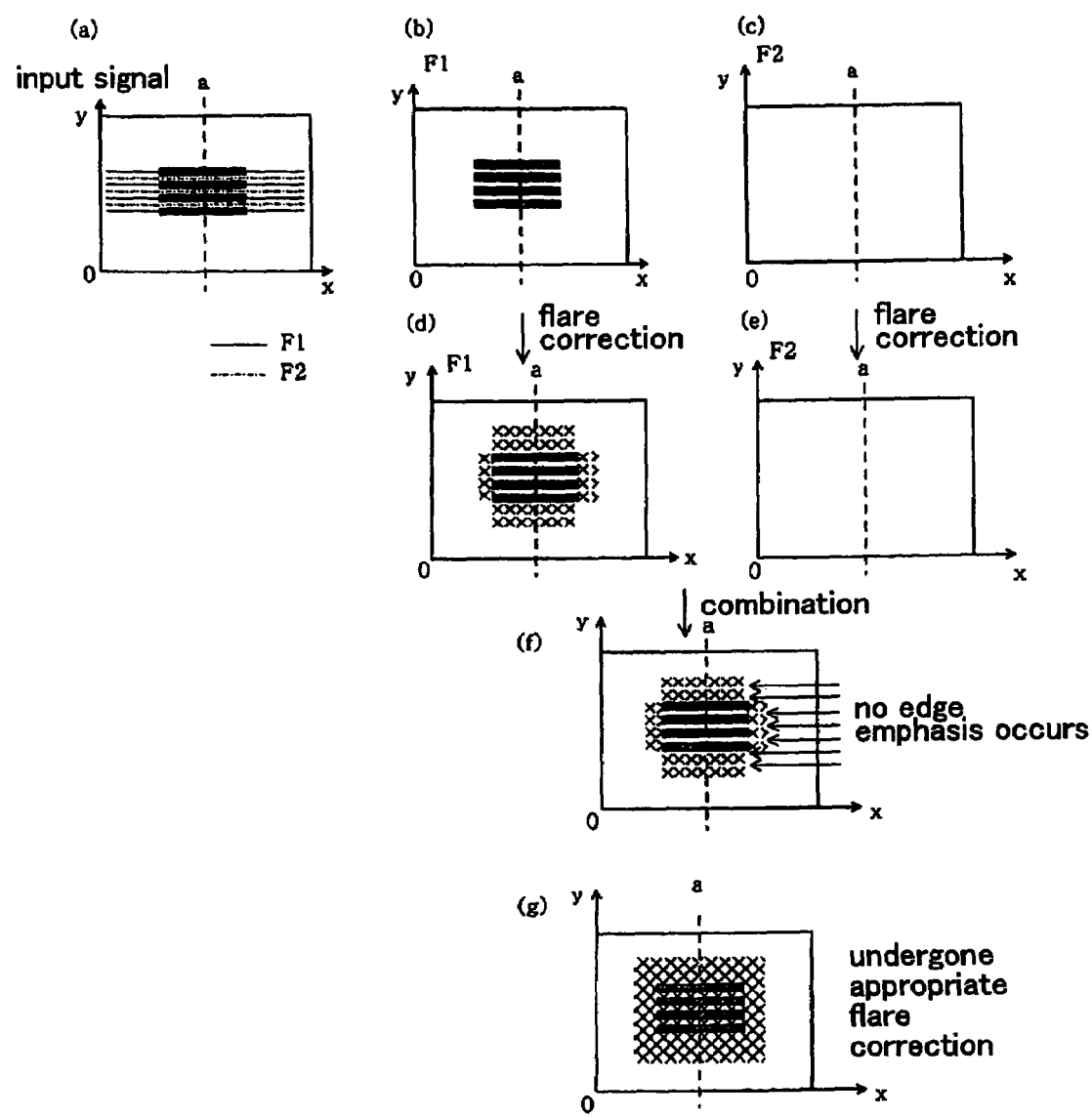
FIG. 3A shows schematic views for explaining a problem that occurs in a picture quality improvement device of the prior art when the interlaced input signal changes with each row.
Figure 5:
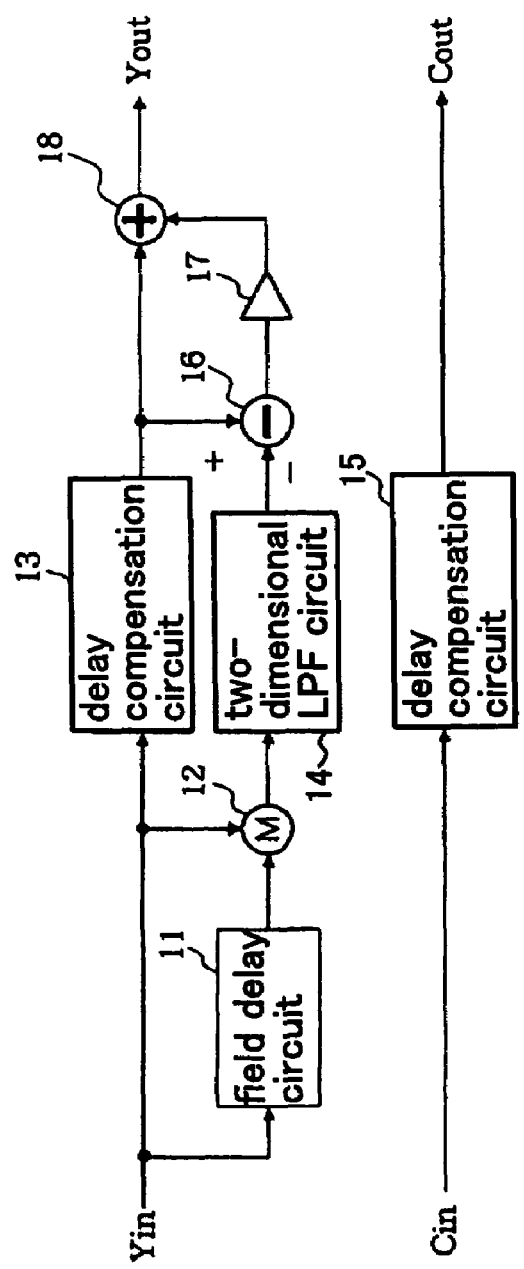
FIG. 5 is a block diagram showing the configuration of a picture quality improvement device of the present invention that carries out flare correction of an interlaced signal.
Figure 6:
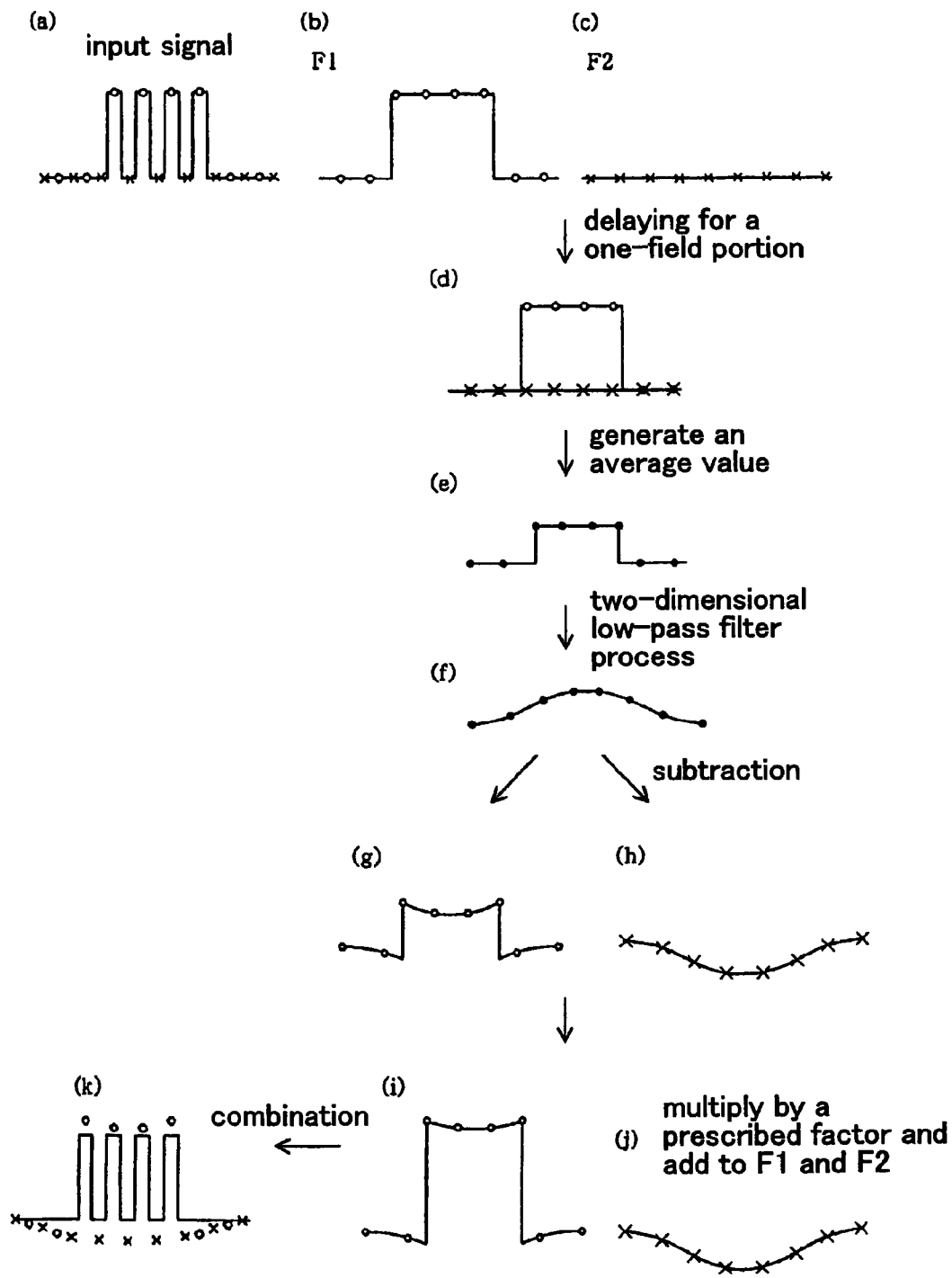
FIG. 6 is a schematic view for explaining the process that is carried out by the picture quality improvement device of the present invention upon the input signal of FIG. 3A (explanation being based on sections taken along line "a" in FIG. 3A).

Referring to FIG. 5, a block diagram is shown that shows the configuration of the picture quality improvement device of the present invention. Referring to FIG. 6, a schematic view is shown for explaining the processes carried out upon the input signal of FIG. 3A by the picture quality improvement device of the present invention (explanation is based on sections taken along lines "a" in FIG. 3A).

In the picture quality improvement device of FIG. 5, flare correction is carried out only for the Y signal. Flare correction may of course be carried out for not only the Y signal, but for the C signal as well. Flare correction may further be carried out in the RGB signal (however, the RGB signal is not often transmitted as an interlaced signal).

The Y input signal (Yin) is applied as input to field delay circuit 11 and delay compensation circuit 13. In addition, the C input signal (Cin) is applied as input to delay compensation circuit 15. Delay compensation circuit 13 delays the Y input signal for the processing time of field delay circuit 11, average value calculation circuit 12, and two-dimensional LPF circuit 14. In addition, delay compensation circuit 15 delays the C input signal for the processing time of field delay circuit 11, average value calculation circuit 12, two-dimensional LPF circuit 14, subtraction circuit 16, amplification circuit 17, and addition circuit 18.

In field delay circuit 11, processing is performed, for delaying for a one-field portion, the F1 signal of the interlaced Y input signal that has been applied as input in the order of the F1 signal (see (b) in FIG. 6) and the F2 signal (see (c) in FIG. 6) (in FIG. 6, (a) is the combination of the F1 signal and the F2 signal). This processing aligns the phases of the data string s1, s2, s3, . . . of the F1 signal and the data string t1, t2, t3, . . . of the F2 signal (see (d) in FIG. 6).

Figure 1:
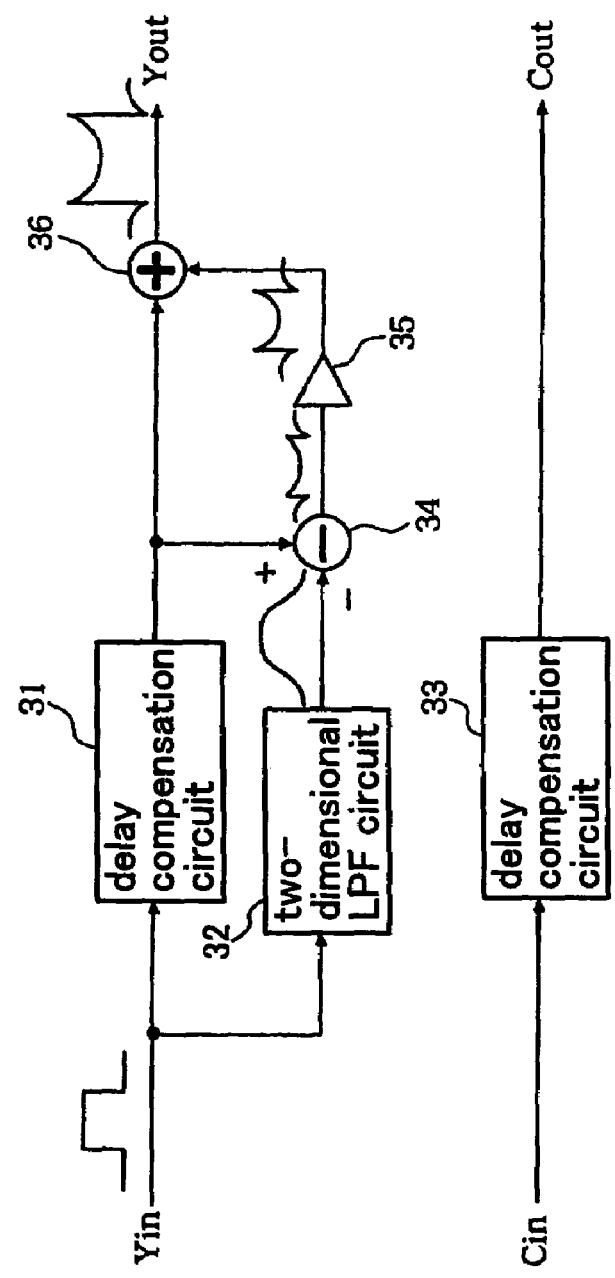
FIG. 1 is a block diagram showing the configuration of a picture quality improvement device of an example of the prior art.
Figure 2:
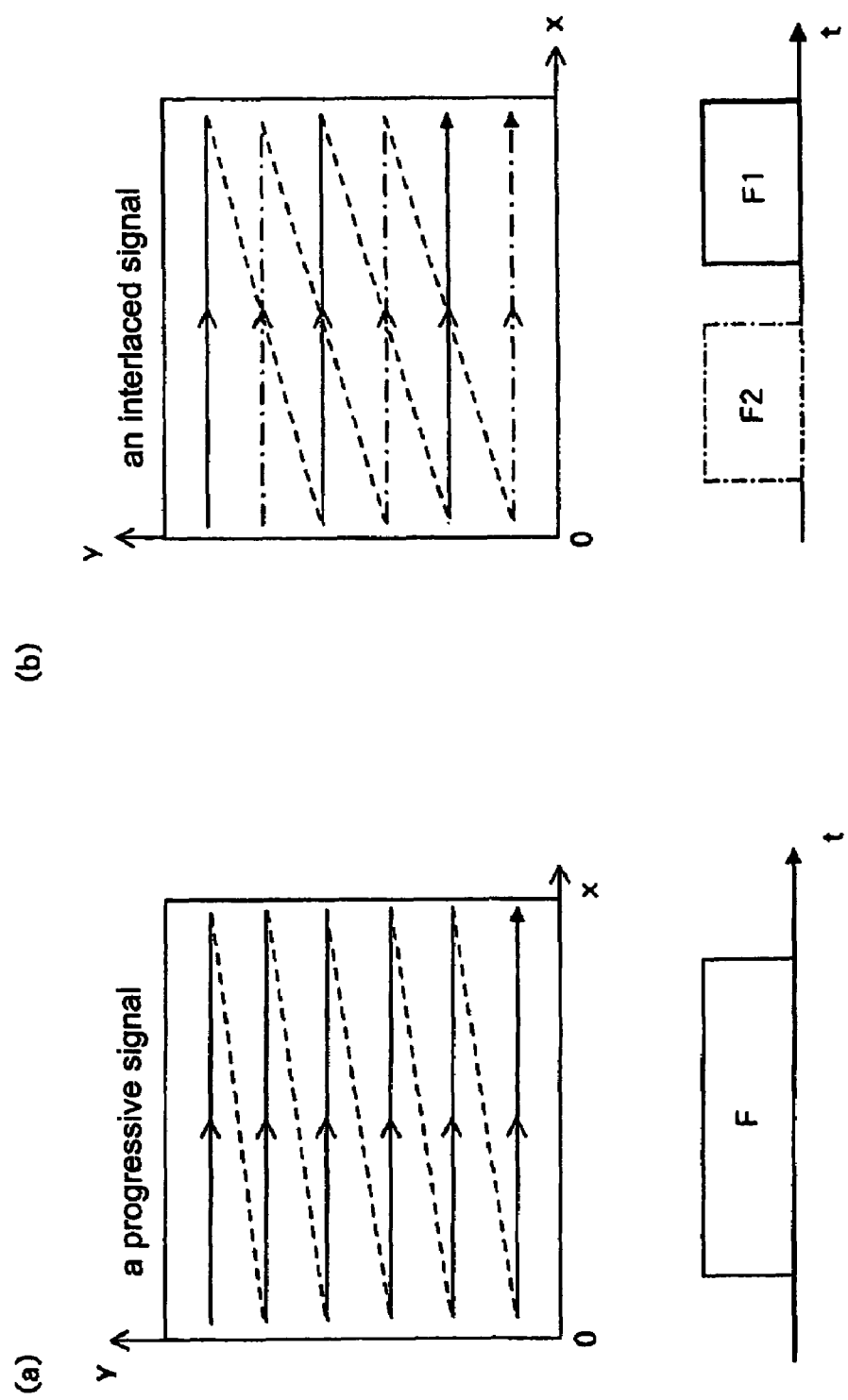
FIG. 2 is a schematic view for explaining an interlaced signal in comparison with a progressive signal.

The F1 signal and the F2 signal in which phases have been matched by field delay circuit 11 are applied as input to average value calculation circuit 12. Average value calculation circuit 12 generates an average value signal of the F1 signal and the F2 signal. In other words, the data string m1, m2, m3, . . . of the average value signal is (s1+t1)/2, (s2+t2)/2, (s3+t3)2, . . . (see (e) of FIG. 6). The F1 signal and the F2 signal that have been applied as input to average value calculation circuit 12 are data of adjacent rows, as explained in FIG. 2, and average value calculation circuit 12 therefore is equivalent to a one-dimensional LPF circuit in the row direction, which is a two-tap one-dimensional LPF circuit in which the filter coefficient of each tap is 0.5 and 0.5. In this case, the taps are units for combining the delay circuit and the amplification circuit, and the filter coefficient is the amplification rate of this amplification circuit. An LPF circuit replaces the data of a particular picture element with the weighted average of the data of a number of adjacent picture elements that corresponds to the tap number and that includes that picture element; and average value calculation circuit 12 can be thought of as one type of such an LPF circuit (a one-dimensional LPF circuit).

The average value signal that is supplied as output from average value calculation circuit 12 is applied to two-dimensional LPF circuit 14. Two-dimensional LPF circuit 14 performs a two-dimensional low-pass filter process upon the average value signal and eliminates frequency components having frequencies that are higher than a prescribed frequency, whereby the edge components of the average value signal are eliminated (see (f) in FIG. 6). The data string of the output signal of two-dimensional LPF circuit 14 is l1, l2, l3, . . . .

In subtraction circuit 16, the output signal of two-dimensional LPF circuit 14 is subtracted from the F1 signal and the F2 signal of the interlaced Y input signal that has been delayed by delay compensation circuit 13, whereby high-frequency components (edge components) are extracted for each of the F1 signal and the F2 signal (see (g) in FIG. 6 for the F1 signal and (h) in FIG. 6 for the F2 signal). The data string u1, u2, u3, . . . of the edge components of the F1 signal is (s1−l1), (s2−l2), (s3−l3), . . . , and the data string v1, v2, v3, . . . of the edge components of the F2 signal is (t1−l1), (t2−l2), (t3−l3), . . . .

The edge components of each field signal that have been extracted by subtraction circuit 16 are multiplied by a prescribed factor by amplification circuit 17. The data string w1, w2, w3, . . . of the edge component of the F1 signal that has been multiplied by a prescribed factor by amplification circuit 17 is $\alpha u1$, $\alpha u2$, $\alpha u3$, . . . (where $\alpha$ is a constant); and the data string x1, x2, x3, . . . of the edge component of the F2 signal that has been multiplied by a prescribed factor by amplification circuit 17 is $\alpha v1$, $\alpha v2$, $\alpha v3$, . . . .

The edge components of each field signal that have been multiplied by a prescribed factor are next added by addition circuit 18 to the original F1 signal and F2 signal, respectively, to emphasize the edges (see (i) in FIG. 6 for the F1 signal and (j) in FIG. 6 for the F2 signal). The data string y1, y2, y3, . . . of the F1 output signal of addition circuit 18 is (s1+w1), (s2+w2), (s3+w3), . . . ; and the data string z1, z2, z3, . . . of the F2 output signal of addition circuit 18 is (t1+x1), (t2+x2), (t3+x3), . . . .

Figure 3B:
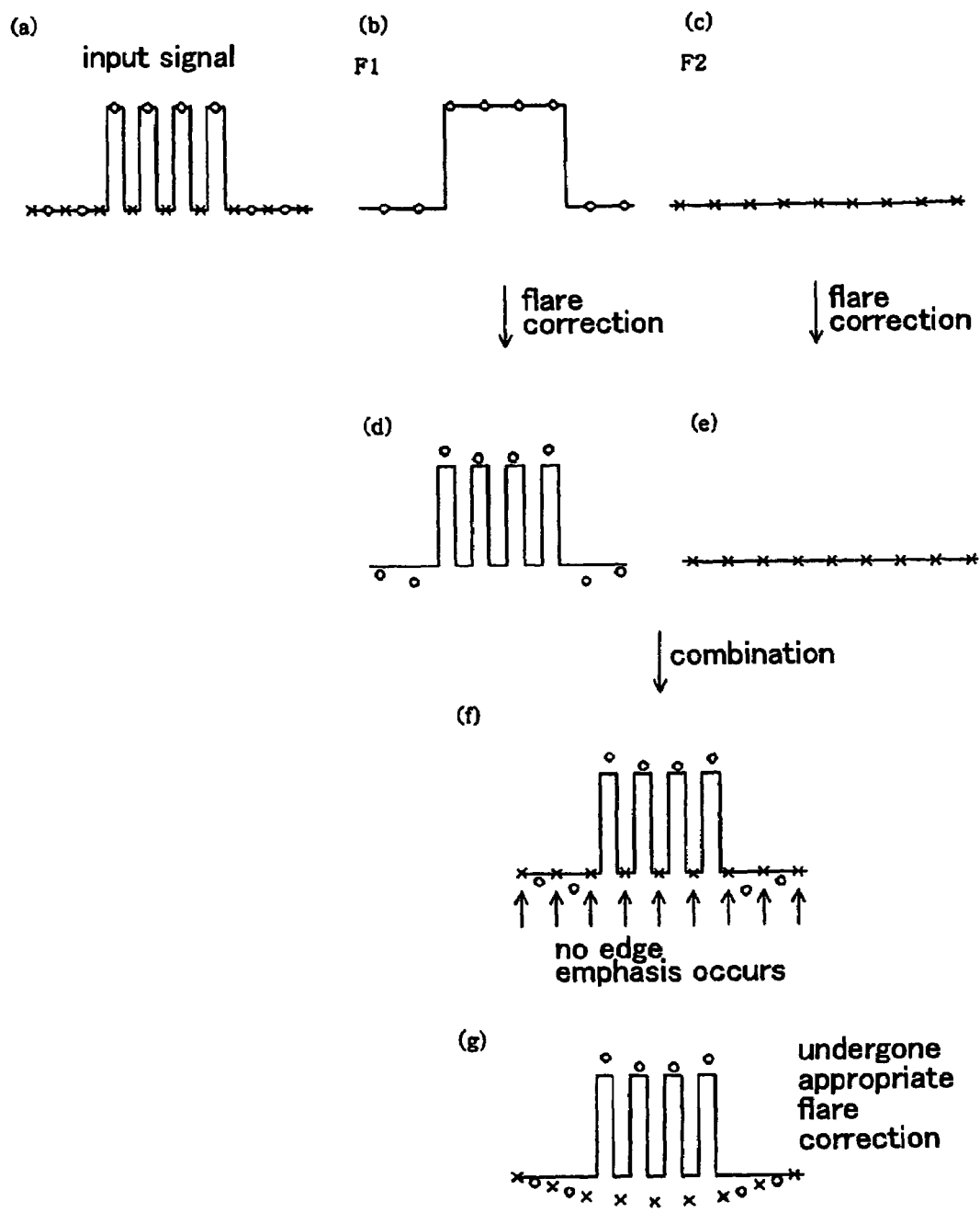
FIG. 3B shows schematic views for explaining a problem that occurs in the picture quality improvement device of the prior art based on sections that are taken along line "a" in each view of FIG. 3A.
Figure 4:
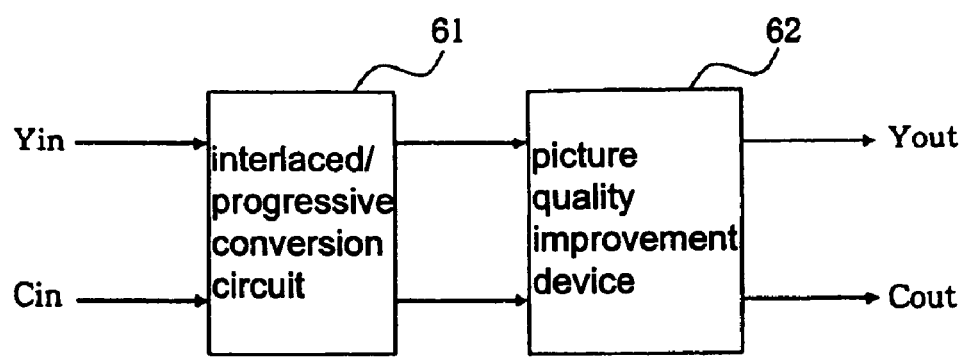
FIG. 4 shows the configuration of a device for solving the problem that occurs in the picture quality improvement device of the prior art by providing an interlaced/progressive conversion circuit and then converting the interlaced signal to a progressive signal.

Finally, these signals are combined, and as the result of combination, in contrast with (f) of FIG. 3B, edge emphasis is achieved even for locations that correspond to the F2 signal (see (k) of FIG. 6). The above-described process thus realizes flare correction.

As described in the foregoing explanation, the generation of the average value signal of the F1 signal and the F2 signal is equivalent to subjecting a progressive signal that has been converted from the relevant interlaced signal to a one-dimensional low-pass filter process in the row direction in which the number of taps is 2 and the filter coefficient of each tap is 0.5, and then thinning the number of resulting data items by one half in the row direction. Accordingly, the high-frequency components (edge components) that are extracted by subjecting the data string of the average value signal to a two-dimensional low-pass filter process and then subtracting the result from the data string of each field signal has far higher accuracy than the high-frequency components that are extracted separately from each field signal, and the high frequency components can be extracted accurately even when the F2 signal is merely a background signal. This greater accuracy is obtained because the high-frequency component is extracted after first reflecting the data of each field signal.

In the present invention, generating the average value signal of the F1 signal and the F2 signal results in carrying out a type of one-dimensional low-pass filter process before carrying out the two-dimensional low-pass filter process, but this does not present a serious problem because the cutoff frequency that is realized by generating the average value signal of the F1 signal and the F2 signal is believed to generally surpass the cutoff frequency that is realized by the two-dimensional low-pass filter process.

In addition, average value calculation circuit 12 causes the sampling phase to shift by one-half clock (data that are generated by average value calculation circuit 12 are data that correspond to a position between the row of the F1 signal and the row of the F2 signal, and the image realized by the average value signal therefore diverges by one-half cycle of picture elements in the row direction). However, the additional performance of a two-dimensional low-pass filter process by means of two-dimensional LPF circuit 14 in a succeeding stage decreases the difference in signal intensity between adjacent picture elements and reduces the importance of the sampling phase. The effect upon the picture quality improvement capability is therefore small despite handling a signal in which the sampling phase has shifted by one-half clock. In addition, the correction signal is obtained by extracting high-frequency components by subtraction from the input signal, and the phase of the high-frequency components of the corrected signal therefore matches that of the input signal. Accordingly, a one-half clock shift in the sampling phase of the signal that has undergone the two-dimensional low-pass filter process presents no serious problem.

While a preferred embodiment of the present invention has been described using specific terms, such description is for illustrative purposes only, and H is to be understood that changes and variations may be made without departing from the spirit or scope of the following claims.

What is claimed is:

1. A picture quality improvement device, said picture quality improvement device receiving as input an interlaced signal in which data of picture elements of adjacent rows are distributed between two field signals that are separated by time and transmitted, and emphasizing edges in a video image at a sampling clock frequency of said interlaced signal; said picture quality improvement device comprising:
   a first means for aligning phases of the two field signals that have been received as input;
   a second means for finding each of average values of data of the same order in data strings of the two field signals for which phases have been aligned by said first means and generating an average value signal having these average values as a data string;
   a third means for subjecting said average value signal to a two-dimensional low-pass filter process and eliminating frequency components having frequencies that are higher than a prescribed frequency;
   a fourth means for subtracting, from the data strings of said two field signals that have been received as input, the data string of said average value signal in which high-frequency components have been eliminated and that has been generated by said third means, and generating signals in which the high-frequency components have been extracted for each of the field signals;
   a fifth means for multiplying, by a prescribed factor, the signals in which high-frequency components have been extracted of each field signal that have been generated by said fourth means; and
   a sixth means for adding, to the data strings of said two field signals that have been received as input, the data strings of the signals in which high-frequency components have been extracted of each field signal and that have been multiplied by the prescribed factor by said fifth means.

2. A picture quality improvement device according to claim 1, wherein said interlaced signal is a luminance signal of a luminance/color difference signal.

3. A picture quality improvement device, said picture quality improvement device receiving as input an interlaced signal in which data of picture elements of adjacent rows are distributed between two field signals that are separated by time and transmitted, and emphasizing edges in a video image at a sampling clock frequency of said interlaced signal; said picture quality improvement device comprising:
   a field delay circuit for aligning phases of the two field signals that have been received as input;
   an average value calculation circuit for finding each of average values of data of the same order in data strings of the two field signals for which phases have been aligned by said field delay circuit and generating an average value signal having these average values as a data string;
   a two-dimensional low-pass filter circuit for subjecting said average value signal to a two-dimensional low-pass filter process and eliminating frequency components having frequencies that are higher than a prescribed frequency;
   a subtraction circuit for subtracting, from the data strings of said two field signals that have been received as input, the data string of said average value signal in which high-frequency components have been eliminated and that has been generated by said two-dimensional low-pass filter circuit, and generating signals in which the high-frequency components have been extracted for each of the field signals;
   an amplification circuit for multiplying, by a prescribed factor, the signals in which high frequency components have been extracted of each field signal that have been generated by said subtraction circuit; and
   an addition circuit for adding, to the data strings of said two field signals that have been received as input, the data strings of the signals in which high-frequency components have been extracted of each field signal and that have been multiplied by the prescribed factor by said amplification circuit.

4. A picture quality improvement device according to claim 3, wherein said interlaced signal is a luminance signal of a luminance/color difference signal.

5. A picture quality improvement method, in which an interlaced signal is received as input in which data of picture elements of adjacent rows are distributed between two field signals that are separated by time and transmitted, and in which edges in a video image are emphasized at a sampling clock frequency of said interlaced signal; said picture quality improvement method comprising:
   a first step of aligning phases of the two field signals that have been received as input;
   a second step of finding each of average values of data of the same order in data strings of the two field signals for which phases have been aligned in said first step and generating an average value signal having these average values as a data string;
   a third step of subjecting said average value signal to a two-dimensional low-pass filter process and eliminating frequency components having frequencies that are higher than a prescribed frequency;
   a fourth step of subtracting, from the data strings of said two field signals that have been received as input, the data string of said average value signal in which high-frequency components have been eliminated and that has been generated by said third means, and generating signals in which the high-frequency components have been extracted for each of the field signals;
   a fifth step of multiplying, by a prescribed factor, the signals in which high-frequency components have been extracted of each field signal that have been generated in said fourth step; and
   a sixth step of adding, to the data strings of said two field signals that have been received as input, the data strings of the signals in which high-frequency components have been extracted of each field signal and that have been multiplied by the prescribed factor in said fifth step.

6. A picture quality improvement method according to claim 5, wherein said interlaced signal is a luminance signal of a luminance/color difference signal.

* * * * *